US011018392B2

(12) United States Patent
Wuensche et al.

(10) Patent No.: US 11,018,392 B2
(45) Date of Patent: May 25, 2021

(54) BATTERY MODULE CARRIER, BATTERY MODULE AND VEHICLE WITH A BATTERY SYSTEM

(71) Applicant: SAMSUNG SDI CO., LTD., Yongin-si (KR)

(72) Inventors: Ralph Wuensche, Graz (AT); Stephan Klomberg, Graz (AT); Thomas Brandner, Rosental (AT); Thomas Renger, Hitzendorf (AT)

(73) Assignee: Samsung SDI Co., Ltd, Yongin-si (KR)

( * ) Notice: Subject to any disclaimer, the term of this patent is extended or adjusted under 35 U.S.C. 154(b) by 202 days.

(21) Appl. No.: 15/220,121

(22) Filed: Jul. 26, 2016

(65) Prior Publication Data

US 2018/0013110 A1 Jan. 11, 2018

Related U.S. Application Data

(60) Provisional application No. 62/359,524, filed on Jul. 7, 2016.

(51) Int. Cl.
*H01M 50/20* (2021.01)
*H01M 10/42* (2006.01)
(Continued)

(52) U.S. Cl.
CPC ............ *H01M 50/20* (2021.01); *B60L 50/64* (2019.02); *H01M 10/425* (2013.01);
(Continued)

(58) Field of Classification Search
CPC .. H01M 2/107; H01M 10/613; H01M 10/625; H01M 10/6556; H01M 2/1083; H01M 10/425; B60L 11/1879
See application file for complete search history.

(56) References Cited

U.S. PATENT DOCUMENTS 10,062,876 B2 * 8/2018 Wuensche ............... B60L 58/12
2007/0087266 A1 4/2007 Bourke et al.
(Continued)

FOREIGN PATENT DOCUMENTS

CN 101326657 A 12/2008
CN 201387911 Y 1/2010
(Continued)

OTHER PUBLICATIONS

Korean Office Action dated May 18, 2018, for corresponding Korean Patent Application No. 10-2016-0142175 (12 pages).
(Continued)

*Primary Examiner* — Helen Oi K Conley
(74) *Attorney, Agent, or Firm* — Lewis Roca Rothgerber Christie LLP

(57) ABSTRACT

A battery module carrier includes a carrier frame configured to accommodate a first component carrier and a second component carrier. The first component carrier includes a control electronics assembly and a signal port, and the second component carrier is configured to accommodate a battery submodule. The carrier frame is configured to provide an external electronic connection to the first component carrier via the signal port, and each of the first component carrier and the second component carrier are configured to be individually attached and detached from the carrier frame.

14 Claims, 3 Drawing Sheets

(51) Int. Cl.
  *B60L 50/64* (2019.01)
  *H01M 10/613* (2014.01)
  *H01M 10/625* (2014.01)
  *H01M 10/6556* (2014.01)

(52) U.S. Cl.
  CPC ....... *H01M 10/613* (2015.04); *H01M 10/625* (2015.04); *H01M 10/6556* (2015.04); *H01M 2220/20* (2013.01); *Y02T 10/70* (2013.01)

(56) References Cited

U.S. PATENT DOCUMENTS

| | | |
|---|---|---|
| 2009/0142650 A1 | 6/2009 | Okada et al. |
| 2010/0081041 A1 | 4/2010 | Okada et al. |
| 2010/0187243 A1* | 7/2010 | Layer ............. A61J 1/035 220/694 |
| 2010/0275619 A1 | 11/2010 | Koetting et al. |
| 2011/0014501 A1* | 1/2011 | Scheucher ........... B60K 1/04 429/7 |
| 2011/0206967 A1 | 8/2011 | Itsuki |
| 2011/0297467 A1 | 12/2011 | Iwasa et al. |
| 2012/0052345 A1* | 3/2012 | Kai ................. B60L 50/64 429/61 |
| 2012/0055725 A1 | 3/2012 | Mizoguchi et al. |
| 2012/0082875 A1 | 4/2012 | Watanabe et al. |
| 2012/0224326 A1 | 9/2012 | Kohlberger et al. |
| 2012/0237803 A1* | 9/2012 | Mardall ............ B60L 3/0046 429/53 |
| 2013/0084478 A1 | 4/2013 | Watanabe et al. |
| 2013/0202926 A1 | 8/2013 | Yoon |
| 2013/0216872 A1 | 8/2013 | Fuhr et al. |
| 2013/0266840 A1 | 10/2013 | Fujii et al. |
| 2013/0288096 A1* | 10/2013 | Frutschy ........... H01M 2/1088 429/99 |
| 2014/0030563 A1 | 1/2014 | Hoshi et al. |
| 2014/0072835 A1 | 3/2014 | Tsujimura et al. |
| 2014/0186683 A1 | 7/2014 | Tyler et al. |
| 2016/0164148 A1 | 6/2016 | Yum et al. |

FOREIGN PATENT DOCUMENTS

| | | |
|---|---|---|
| CN | 102170032 A | 8/2011 |
| CN | 103165834 A | 6/2013 |
| CN | 103247766 A | 8/2013 |
| EP | 2712006 A1 | 3/2014 |
| EP | 3035416 A1 | 6/2016 |
| JP | 2001-6643 A | 1/2001 |
| JP | 2002-190288 A | 7/2002 |
| JP | 2009-134900 A | 6/2009 |
| JP | 2011-6051 A | 1/2011 |
| JP | 2012-79508 A | 4/2012 |
| JP | 2012-123917 A | 6/2012 |
| JP | 2012-243449 A | 12/2012 |
| JP | 2013-12480 A | 1/2013 |
| JP | 2013-122821 A | 6/2013 |
| JP | 2013-125617 A | 6/2013 |
| JP | 2014-22157 A | 2/2014 |
| JP | 2014-89822 A | 5/2014 |
| JP | 2014-203770 A | 10/2014 |
| JP | 2016-16351 A | 2/2016 |
| JP | 2016-81857 A | 5/2016 |
| KR | 10-2010-0119497 | 11/2010 |
| KR | 10-2011-0108403 A | 10/2011 |
| KR | 10-2012-0100907 | 9/2012 |
| WO | 2012/066874 A1 | 5/2012 |
| WO | 2012/133709 A1 | 10/2012 |
| WO | 2012/140791 A1 | 10/2012 |
| WO | 2016/089030 A1 | 6/2016 |

OTHER PUBLICATIONS

EPO Partial Search Report dated May 12, 2017, for corresponding European Patent Application No. 16200640.7 (17 pages).
EPO Extended Search Report dated Sep. 6, 2017, for corresponding European Patent Application No. 16200640.7 (20 pages).
International Search Report dated Oct. 16, 2017, for corresponding International (PCT) Application No. PCT/KR2017/007241 (104 pages).
U.S. Office Action dated Nov. 16, 2017, issued in U.S. Appl. No. 15/642,217 (6 pages).
U.S. Notice of Allowance dated Mar. 29, 2018, issued in U.S. Appl. No. 15/642,217 (10 pages).
EPO Office Action dated Sep. 13, 2018, for corresponding European Patent Application No. 16200640.7 (9 pages).
Korean Office Action dated Nov. 28, 2018, for corresponding Korean Patent Application No. 10-2016-0142175 (10 pages).
Extended European Search Report for corresponding European Application No. 19155009.4, dated May 20, 2019, 12 pages.
Korean Notice of Allowance for corresponding Korean Application No. 10-2016-0142175, dated May 22, 2019, 6 pages.
EPO Extended Search Report dated Dec. 9, 2019, for corresponding European Patent Application No. 17824559.3 (9 pages).
Japanese Office Action dated Dec. 23, 2019, for corresponding Chinese Patent Application No. 2018-568748 (4 pages).
Japanese Office Action dated Sep. 14, 2020, for corresponding Japanese Patent Application No. 2016-228789 (6 pages).
Chinese Office action issued in corresponding Application No. CN 201611069808.0, dated Jan. 5, 2021, 27 pages.
Chinese Office action issued in corresponding Application No. CN 201780038484.0, dated Jan. 5, 2021, 30 pages.

* cited by examiner

BATTERY MODULE CARRIER, BATTERY MODULE AND VEHICLE WITH A BATTERY SYSTEM

CROSS-REFERENCE TO RELATED APPLICATION

This application claims priority to and the benefit of U.S. Provisional Patent Application No. 62/359,524, filed on Jul. 7, 2016 in the U.S. Patent and Trademark Office, the entire content of which is incorporated herein by reference.

BACKGROUND

1. Field

Embodiments of the present invention relate to a battery module carrier, a battery system with such a battery module carrier, and a vehicle with such a battery system.

2. Description of the Related Art

A rechargeable (or secondary) battery differs from a primary battery in that the former is designed to be repeatedly charged and discharged while the latter provides an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for hybrid vehicles and the like.

In general, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case in order to enable charging and discharging of the battery via an electrochemical reaction between the positive electrode, the negative electrode, and the electrolyte solution. The shape of the case, for example, a cylindrical or rectangular shape, depends on the intended purpose of the battery.

Rechargeable batteries may be used in a battery module including a plurality of unit battery cells coupled to each other in series and/or in parallel so as to provide a relatively high energy density for, as an example, driving a motor of a hybrid vehicle. For example, the battery module is formed by interconnecting the electrode terminals of the plurality of unit battery cells to each other, the number of unit battery cells depending on a desired amount of power, in order to realize a relatively high-power rechargeable battery module for, as an example, an electric vehicle.

Battery modules can be constructed in a block design or in a modular design. In the block design, each battery cell is coupled to one common current collector structure and battery management system, and the batteries are arranged in a housing. In the modular design, a plurality of battery cells are connected in submodules, and several submodules are connected to each other to form the module. In the modular design, different battery management functions can be realized on a module or submodule level, which provides favorable aspects, such as improved interchangeability.

To form a battery system, one or more battery modules are mechanically and electrically integrated, equipped with a thermal management system, and configured to communicate with one or more electrical consumers (e.g., energy consumption circuits or devices). Further, the battery system may include a battery management unit (BMU) and/or a battery disconnect unit (BDU).

The above information disclosed in this Background section is only for enhancement of understanding of the background of the described technology and therefore it may contain information that does not form the prior art.

SUMMARY

One or more of the drawbacks of the prior art are avoided or reduced by a battery module carrier, a battery system, and a vehicle with a battery system according to one or more embodiments of the present invention.

According to some embodiments of the present invention, a battery module carrier includes a carrier frame configured to accommodate a first component carrier and a second component carrier, the first component carrier including a control electronics assembly and a signal port, and the second component carrier being configured to accommodate a battery submodule. The carrier frame is configured to provide an external electronic connection to the first component carrier via the signal port. Further, each of the first component carrier and the second component carrier are configured to be individually attached and detached from the carrier frame.

The battery module carrier according to one or more embodiments of the present invention provides a carrier for a battery system that allows for interchangeable components of a battery system by providing component carriers that are attachable and detachable from a carrier frame one by one (or separately or individually). The first and second component carriers may provide different functions. The first component carrier (or electrics carrier) may include a control electronics assembly, e.g., a battery management system or parts thereof as a battery monitoring unit. The second component carrier (or cell carrier) may include one or more battery submodules, and may include several mounting parts for mounting the battery submodules to the second component carrier. As these component carriers can be individually attached and detached from the carrier frame, one of the component carriers can be removed from the battery module carrier without dismounting the battery module carrier in its entirety, for example, from a vehicle. The battery module carrier according to one or more embodiments of the present invention thus provides the mechanical framework for a battery system with increased modularity.

In some embodiments, the first component carrier and the second component carrier are each essentially monolithic. In other words, each of the first and second component carriers is a single piece component that provides the mechanical integrity for supporting either the control electronics assembly or one or more battery submodules. In some embodiments, the first component carrier and the second component carrier both have monolithic extrusion profiles, for example aluminum extrusion profiles. According to this embodiment, the manufacturing of the component carriers and assembling of the battery system is relatively simple and cost-effective. In some embodiments, the battery module carrier is configured to receive one first component carrier and a plurality of second component carriers. Further, in some embodiments, the second component carrier is configured to receive one row of stacked batteries, e.g., one battery submodule or a plurality of longitudinally aligned battery submodules.

The battery module carrier according to embodiments of the present invention further provides the connection framework for a battery system with increased modularity, for example, the connection framework with respect to signal transmission, power transmission and coolant supply. The battery module carrier according to embodiments of the present invention includes a first component carrier with a control electronics assembly and a signal port and further includes a carrier frame that is configured to provide an external electronic connection to the first component carrier via the signal port. As such, the battery module carrier as a whole can receive and transmit signals for controlling the battery system, e.g., the battery submodules, via the external electronical connection.

In some embodiments, the carrier frame may include an external signal port and an internal signal port connected to the external signal port and configured to electronically connect the carrier frame to the first component carrier via the signal port. In some embodiments, the carrier frame, e.g., the external signal port, may be configured to connect to an external control unit, e.g., a control unit of a battery system or one or more electrical consumers. The signals received by the external control unit may be provided to the control electronics assembly on the first component carrier that controls the battery submodules on the second component carriers according to the signals. In some embodiments, only the control electronics assembly may include a signal port and the carrier frame may include an opening, e.g. a slit, through which the signal port of the control electronics assembly may be guided in order to provide an external electronic connection. In some embodiments, the signal ports in the carrier frame may be omitted.

In some embodiments, the carrier frame may include an external power port configured to electrically connect an external power circuit (e.g., a power circuit of a battery system, a battery management system or one or more electrical consumers) to at least one of the second component carrier, a battery submodule and a power port of the first component carrier. The carrier frame may include an internal power port that is connected to the external power port and that is configured for electrically connecting the carrier frame to at least one of the second component carrier, a battery submodule and a power port of the first component carrier. The internal power port may thus be connected via the first component carrier and/or the control electronics assembly to at least one second component carrier and battery submodule, or may be directly connected to a battery submodule.

In some embodiments, the battery module carrier as a whole (or in its entirety) may be integrated in an external power circuit (e.g. a power circuit of a vehicle), for example, via the external power port. The external power circuit, and the external power port may be electrically connected to the first component carrier (e.g., the control electronics assembly) and electrically connected to each of the second component carriers (e.g., the battery submodules on each of the second component carriers). Thus, when the battery module carrier is in an assembled configuration (or assembled state), the first component carrier and the second component carrier are electrically interconnected, e.g., connected to transmit an electric current to meet power demands, and also electronically connected, e.g., connected to transmit signals, for example, via an electric current. The first component carrier may be connected to each of a plurality of second component carriers or only to an adjacent one of the second component carriers of a plurality of interconnected second component carriers. In some embodiments, the second component carriers may be electrically connected to the external power port but not to the first component carrier.

In some embodiments of the present invention, the battery module carrier may include a ground plate attached to the carrier frame and connected to or including a coolant duct. The ground plate may also form part of the carrier frame. The battery module carrier, (e.g., the carrier frame) may further include external coolant ports configured to connect the battery module carrier (e.g., the carrier frame and/or the ground plate) to an external coolant circuit. The coolant duct of the ground plate may be connected to these external coolant ports, e.g., via a coolant distribution line. Thus, the battery module carrier as a whole may include an internal coolant circuit that may be connected to the external coolant circuit via external coolant ports. The first and second component carriers received by the carrier frame may be placed in close contact with the ground plate and thus may be cooled by exchanging heat with the internal coolant circuit of the ground plate.

In some embodiments of the present invention, the battery module carrier (e.g., the carrier frame) may include external coolant ports configured to connect the battery module carrier to an external coolant circuit, and at least one of the first component carrier and the second component carrier may include first or second coolant ports, respectively, and a first or second ground plate and/or side plate with a coolant duct connected to the respective first or second coolant ports. As such, the first and second component carriers may respectively include the first and second ground plates and the first and second ground plates may together form a ground plate of the battery module carrier. It is to be understood that the first and second ground plates of the first and second component carriers, respectively, may be integral with the component carriers and must not be an additional component of the component carriers. The battery module carrier, (e.g., the carrier frame) may connect the external coolant ports to the first or second coolant ports of at least one of the first component carrier and the second component carrier, respectively. For example, the battery module carrier (e.g., the carrier frame) may include a coolant distribution line connected (e.g., fluidly connected) to the external coolant ports and configured to be connected (e.g., fluidly connected) to the coolant ports of at least one of the first component carrier and the second component carrier. As such, the internal coolant circuit of the battery module carrier may be constituted of the internal coolant circuits of the first component carrier and one or more of the second component carriers.

In some embodiments, the carrier frame may be configured to receive one first component carrier and a plurality of second component carriers, and may include a coolant distribution line connected to (e.g., fluidly connected to) the external coolant ports of the battery module carrier (e.g., the carrier frame). The coolant distribution line is configured to be connected to one or both of the coolant ports of the first component carrier and each of the plurality of the second component carriers (e.g., to one or both of the first coolant ports and the second coolant ports). The coolant distribution line may be positioned within the carrier frame or may be an external part attached to the carrier frame. The coolant connections and the coolant distribution line may be located outside of the cells and electric parts of the battery module carrier to avoid short circuits in case of a leakage, or to reduce the likelihood of short circuits.

In some embodiments of the present invention, the battery module carrier may include an external signal port that is configured to electronically connect the carrier frame to an external control unit. The external control unit may be a control circuit of a battery system, a battery management system or of one or more electrical consumers. In some embodiments, the control electronics assembly may include a battery monitoring unit, while other functions of a battery management system may be realized outside from the battery module carrier. The control electronics assembly may include relays, fuses, electronics and/or high voltage (HV) and/or low voltage (LV) wiring. The control electronics assembly may be configured to provide one or more of the following functions: protecting the battery system from damage, prolonging the life of the battery system, and maintaining the battery system in a state in which it can meet the functional requirements of the application for which it was specified. The control electronics assembly is may also be configured to provide one or more of the following functions: cell protection, charge control, state of charge determination, state of health determination, cell balancing, log book function, authentication, and identification of cells and signal communication. The first component carrier, e.g., the control electronics assembly, may be electronically connected to at least one of the second component carriers and/or the battery submodule.

In some embodiments of the battery module carrier according to the present invention, the carrier frame may include a plurality of longitudinal beams and a plurality of crossbeams. The longitudinal beams and the crossbeams of the carrier frame may have aluminum extrusion profiles or plastic extrusion profiles (e.g., reinforced plastic extrusion profiles) and may be welded, glued, screwed or otherwise assembled together to form the carrier frame. The first and second component carriers may also have aluminum extrusion profiles, plastic extrusion profiles (e.g., reinforced plastic extrusion profiles) or may be made of rolled and welded steel carriers, and may have, for example, a U-shape, an L-shape, or a T-shape. The component carriers may include connection elements configured to be detachably attached to the longitudinal beams or the crossbeams, e.g., to corresponding connection elements of the longitudinal beams or the crossbeams. The component carriers may have an integrated coolant duct or coolant channels in a ground plate and/or in side walls thereof. The component carriers may be mounted with screws to the carrier frame. The assembled battery module carrier including the component carriers mounted to the carrier frame may provide a stiff and stable (or relatively stable) structure.

In some embodiments, the second component carrier may include (or may consist of) an extruded aluminum profile for supporting a number of cells. The cells may be fixed in the longitudinal direction of the second component carrier with end plates. Plastic cell fixations may mount the cells in the z-direction. A free space between the end plates and the carrier frame or the cells may be filled with swelling restrictors to handle (or accommodate) swelling of the cell(s) and to connect the components (e.g., all components) in the longitudinal direction (e.g., to connect the components stiffly and tightly). This stiffness is favored in case of a side, front or rear crash of a vehicle comprising the battery module carrier according to the invention.

According to an embodiment of the present invention, the component carriers are mechanically interconnected via a plurality of bolts. The bolts provide easy assembling and disassembling and may establish (or provide) the electrical and signal connections between each component carrier. For example, the bolts may be configured to electrically and electronically connect the first component carrier to the second component carrier and/or to the battery submodule. In some embodiments, the component carriers may be screwed to the carrier frame. The screws may be accessible from a bottom side of the carrier.

Another embodiment of the present invention provides a battery system including a battery module carrier according to one or more embodiments of the present invention, as described above. The battery system according to one or more embodiments of the present invention includes a carrier frame including a first component carrier and a second carrier, and may include an external signal port. The first component carrier includes a control electronics assembly and a signal port, and the second component carrier includes a battery submodule. The carrier frame of the battery system may further include an internal signal port electronically connected to the external signal port and the signal port of the first component carrier. In some embodiments, the carrier frame may include an opening, e.g., a slit through which the signal port of the first carrier frame is passed to the outside. In the battery system according to one or more embodiments of the present invention, each of the first component carrier and the second component carrier may be individually detached from the carrier frame.

Another embodiment of the present invention relates to a vehicle including a battery system according to one or more embodiments of the present invention, as described above (e.g., a battery system including a battery module carrier according to one or more embodiments of the present invention, as described above). The vehicle according to one or more embodiments of the present invention may be an electric vehicle (EV) or a plug-in hybrid electric vehicle (PHEV) including several battery cells. In some embodiments, the mounting location of the battery system may be underneath a floor of the vehicle. In some embodiments, the carrier frame of the battery module carrier is attached to the floor of the vehicle, e.g., to a mounting structure at an underbody of the vehicle. One or more of the first component carrier and the second component carrier may be removed from the carrier frame without dismounting the carrier frame from the floor of the vehicle.

The battery system attached to the vehicle may be gastight by installing an underbody protection plate underneath and a cover plate on top of the battery module carrier. In a battery system according to one or more embodiments of the present invention that is attached to (or mounted on) a vehicle, all connection elements (e.g., bolts or screws or the like), should be accessible from the bottom side facing away from the underbody of the vehicle. In case of cooling ducts integrated in the carriers, the coolant distribution lines may need to be dismounted before detaching a component carrier. Thus, the coolant distribution line may also be accessible from underneath the vehicle.

BRIEF DESCRIPTION OF THE DRAWINGS

The above and other aspects of the present invention will become more apparent to those of ordinary skill in the art by describing, in detail, exemplary embodiments thereof with reference to the attached drawings, in which.

DETAILED DESCRIPTION

Figure 1:
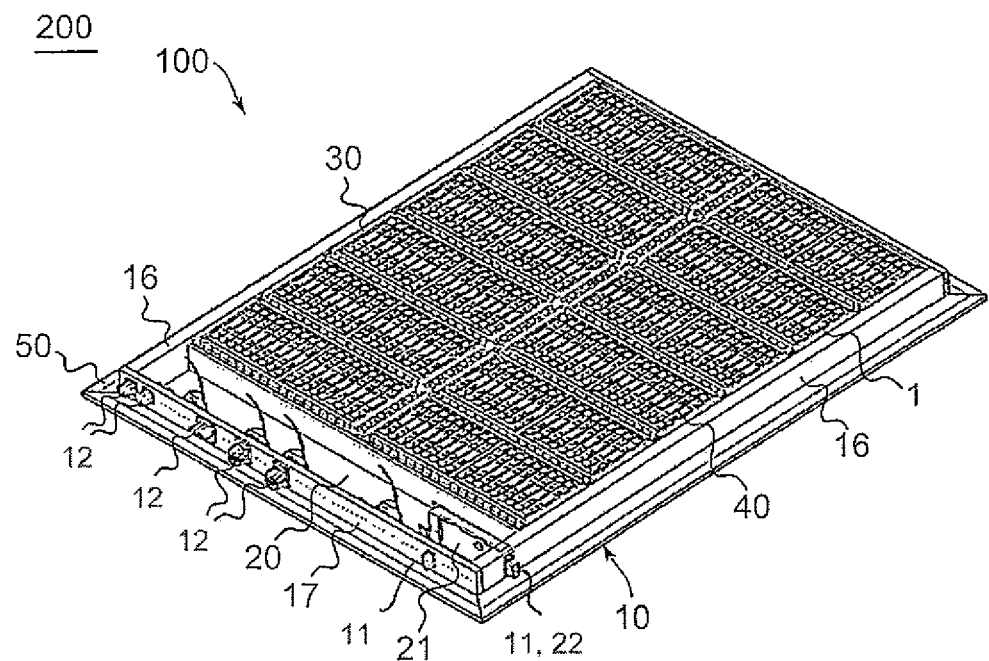
FIG. 1 is a perspective view of a battery system according to an exemplary embodiment of the present invention.

Hereinafter, example embodiments of the present invention will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." In addition, the use of alternative language, such as "or," when describing embodiments of the present invention, refers to "one or more embodiments of the present invention" for each corresponding item listed. As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

For electrical integration in a battery module having the modular design, either submodules including a plurality of cells connected to each other in parallel are connected to each other in series (XsYp) or submodules including a plurality of cells connected to each other in series are connected to each other in parallel (XpYs). XsYp-type submodules can generate relatively high voltages, but the voltage level of each individual cell has to be individually controlled. Thus, wiring complexity is relatively high in XsYp-type submodules. In XpYs-type submodules, the voltage levels of the cells connected to each other in parallel are automatically balanced, and thus, it is sufficient to control the voltage on the submodule level. Thus, wiring complexity is reduced in XpYs-type submodules. In submodules of cells connected to each other in parallel their capacitance adds up, and thus, XpYs-type submodules are generally used with low capacitance cells.

The thermal management system allows for safe use of the battery module by efficiently emitting, discharging, and/or dissipating heat generated by the rechargeable batteries. If the heat emission/discharge/dissipation is not sufficiently performed, temperature deviations occur between the respective battery cells, such that the battery module cannot generate a desired amount of power. In addition, an increase of internal temperatures of the rechargeable batteries can lead to abnormal reactions occurring therein, thus causing charging and discharging performance of the rechargeable batteries to deteriorate and the life-span of the rechargeable batteries to be shortened. Thus, cooling devices for effectively emitting/discharging/dissipating heat from the cells are often provided.

To meet the dynamic power demands of various electrical consumers connected to the battery system, static control of battery power output and charging may not be sufficient. Thus, a steady exchange of information between the battery system and the controllers of the electrical consumers may be implemented. Important information, such as the battery system's actual state of charge (SoC), potential electrical performance, charging ability and internal resistance, as well as actual or predicted power demands or surpluses of the consumers, may be communicated.

Mechanical integration of the battery module refers to mechanical connection of the individual components among themselves and to a structure of the powered system (e.g., the system providing the electrical information, such as a vehicle). These connections are designed to remain functional and safe during the average service life of the battery system and under the stresses endured during use of the powered device (e.g., during use of the vehicle). Also, installation space and interchangeability requirements should be considered, especially in mobile applications.

Mechanical integration of battery modules can be achieved by providing a carrier plate (e.g., a ground plate) and by positioning individual battery cells or submodules thereon. Fixing the battery cells or submodules to the carrier plate can be achieved by fitting the battery cells or submodules into depressions in the carrier plate, by mechanical interconnectors, such as bolts or screws, or by confining the cells or submodules. Confinement can be achieved by fastening side plates to lateral sides of the carrier plate and/or by providing a second carrier plate atop the battery cells or submodules and fixing the second carrier plate to the carrier plate and/or side plates. Thus, multilevel battery modules can be constructed, and the carrier plates and/or side plates may include coolant ducts for cooling the cells or submodules.

Mechanical integration of the battery submodules may generally be achieved by using mechanically reinforced electrical connectors or by fastening the battery cells onto carrier beams or struts in addition to the electrical connectors. Additionally or alternatively, the submodules can be arranged in individual casings covering some or all of the surfaces of the battery submodule and arranged into a battery module (e.g., onto a carrier plate) within these individual casings.

Battery modules according to the prior art, despite any modular structure, generally provide mechanical integrity by the interconnections of all their constituting parts. Thus, replacement of a part of the battery module, for example, replacement of a submodule, usually requires dismounting the entire battery module in order to mechanically relieve the battery module before disassembling. Thus, defects in a component of a battery module usually lead to dismounting and replacement of the entire battery module and a separate repair of the battery module. As battery modules might be expensive, large, and heavy, many places that will handle battery problems in the future, such as car garages, might not stock replacement battery modules in sufficient quantity to meet demand.

FIG. 1 illustrates a battery system 200 including a battery module carrier 100 according to an exemplary embodiment of the present invention. The battery module carrier 100 includes a carrier frame 10 including a plurality of longitudinal beams 16 (e.g., two longitudinal beams) and a plurality of crossbeams 17 (e.g., two crossbeams). A ground plate frame 50 is attached to the beams 16, 17 and frames a bottom of the battery module carrier 100. Connection members (e.g., screw holes) for attaching the battery module carrier 100 to, for example, a vehicle's underbody, are arranged within a portion of the ground plate frame 50 that protrudes outwardly from the beams 16, 17.

One of the longitudinal beams 16 includes a signal port 22 of a first component carrier 20 that extends (or reaches) through an opening in the carrier frame 10 as an external signal port 11 and is configured to be connected to an external control unit. One of the crossbeams 17 includes external power ports 12 that are configured to be connected to an external power circuit. The battery module carrier 100 further includes external coolant ports that are configured to be connected to an external coolant circuit. Within the carrier frame 10, the first component carrier 20 and a plurality of second component carriers 30 (e.g., six second component carriers 30) are received (or accommodated). Each of the plurality of second component carriers 30 includes one or more battery submodules 40 (e.g., two battery submodules 40), each having a plurality of cells 1.

Figure 2:
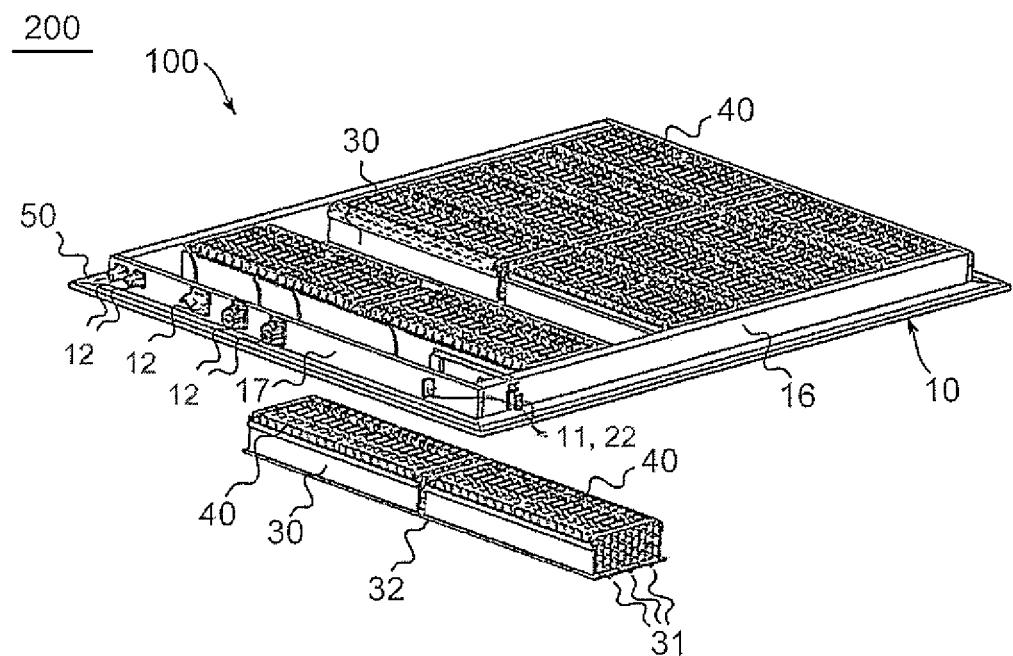
FIG. 2 is a perspective view of a battery system according to an exemplary embodiment of the present invention with a second component carrier removed from the battery system.
Figure 4:
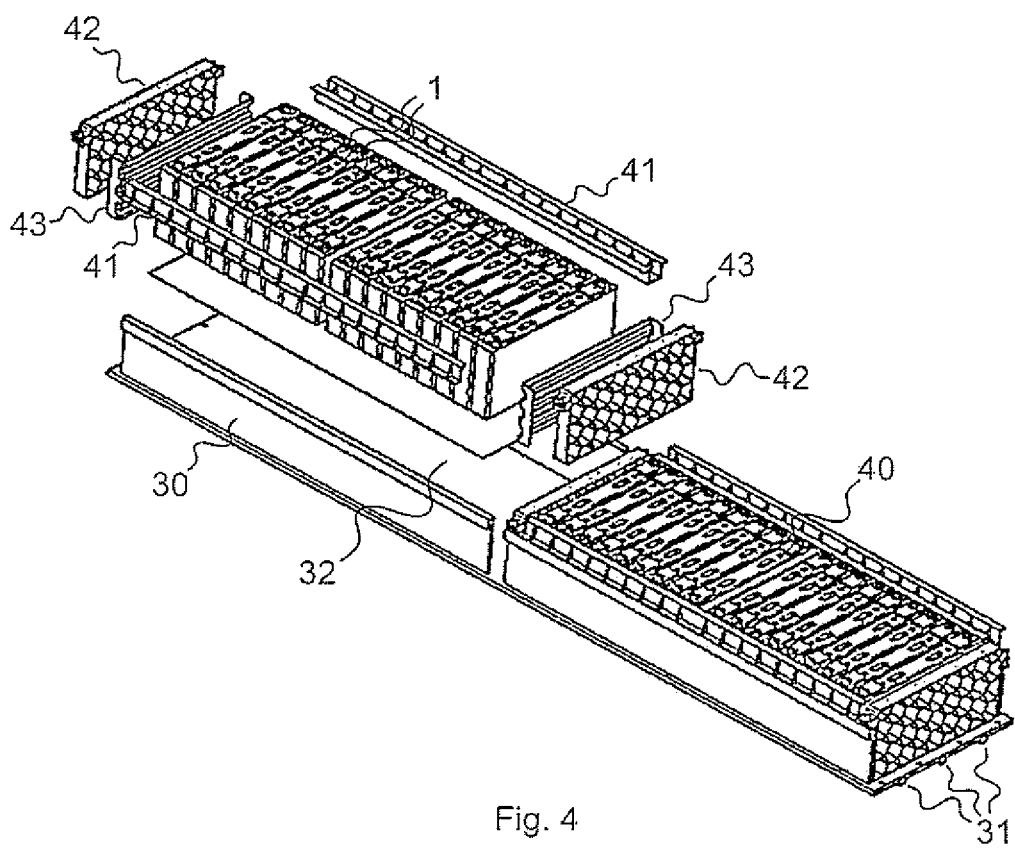
FIG. 4 is a partially exploded view of a second component carrier according to an exemplary embodiment of the present invention including two received battery submodules.

FIG. 2 is a perspective view of the battery system 200 according to an exemplary embodiment of the present invention with one of the second component carriers 30 removed from the battery system 200, and FIG. 4 is a partially exploded view of the second component carrier 30 according to an exemplary embodiment of the present invention including two battery submodules 40 in the second component carrier 30. Referring to FIGS. 2 and 4, the second component carrier 30 includes a ground plate 32 and side walls extending in an upward direction from the ground plate 32. At a first surface (or a front surface) of the ground plate 32, second coolant ports 31 (e.g., three second coolant ports) that are entrances to respective coolant ducts are provided. The second component carrier 30 includes connection elements (e.g., screw holes) that are configured to be attached to corresponding connection elements of the longitudinal beams 16 of the carrier frame. The second component carrier 30 further includes connecting elements for electrically and electronically connecting the second component carriers 30 other second component carriers 30 or to the first component carrier 20 within the battery system 200.

Referring to FIG. 4, an exemplary embodiment of a battery submodule 40 includes a plurality of cells 1 (e.g., a plurality of aligned secondary battery cells 1), the cells each having a substantially prismatic shape. A pair of submodule front plates 43 is provided to respectively face surfaces (e.g., front surfaces) of the outermost battery cells 1. The module front plates 43 are mechanically coupled to a pair of submodule side beams 41 facing side surfaces of the battery cells 1. Thereby the battery cells 1 of the plurality of battery cells 1 are fixed together. The submodule front plates 43 provide stiffness and mechanical stability to the battery submodule 40. Swelling restrictors 42 having a honeycomb structure are interposed between the stacked battery cells 1 and the carrier frame 10 to accommodate (or restrict) swelling of the battery cell(s) 1 and to connect all components along a longitudinal direction (e.g., to stiffly and tightly connect all components of the battery submodule 40 along the longitudinal direction). The submodule front plates 43, the submodule side beams 41, and the cells 1 constitute an essentially self-supporting body of the battery submodule 40. The battery submodule 40 is mechanically fixed to the second component carrier 30 by fixing elements.

Figure 3:
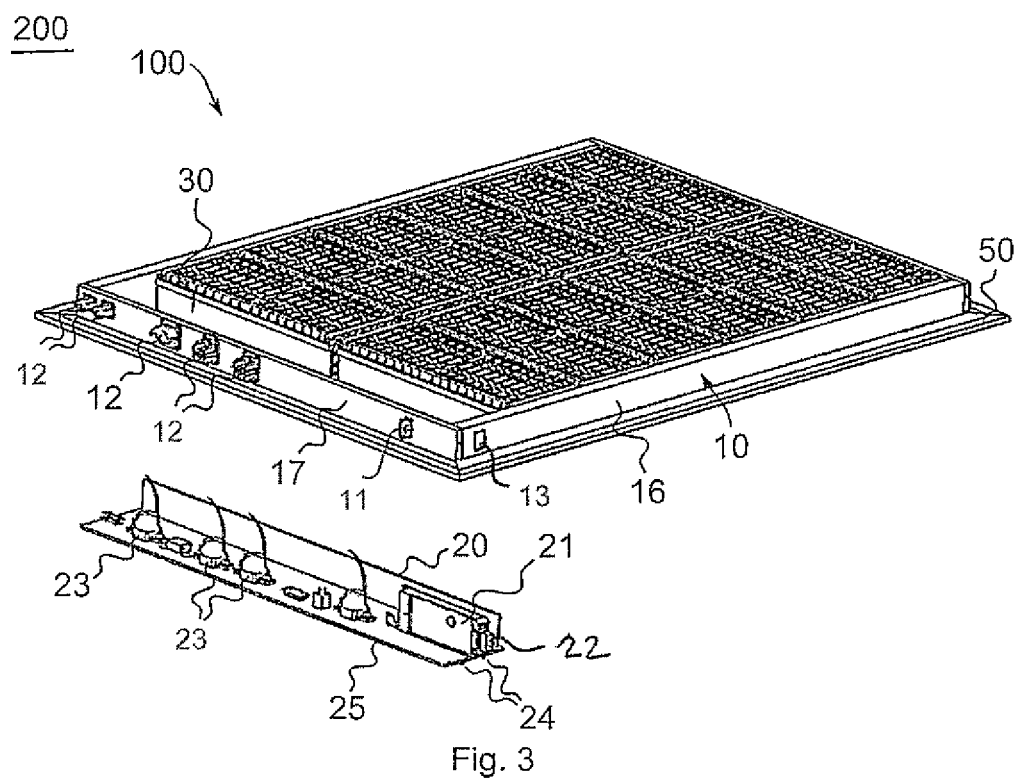
FIG. 3 is a perspective view of a battery system according to an exemplary embodiment of the present invention with a first component carrier removed from the battery system.

FIG. 3 is a perspective view of the battery system 200 according to an exemplary embodiment of the present invention in which the first component carrier 20 is removed from the battery system 200. The first component carrier 20 includes a ground plate 25 and a side wall extending in an upward direction therefrom. At a first surface (or a front surface) of the ground plate 25, first coolant ports 24 (e.g., three first coolant ports) which are the entrances to respective coolant ducts are provided. The first component carrier 20 further includes a signal port 22, power ports 23, and a control electronics assembly 21. Control signaling occurs between an external control circuit via the signal port 22 (that is guided through an opening 13 in the carrier frame 10) to the control electronics assembly 21 of the first component carrier 20. Additionally, signaling may occur from the external control unit via an external signal port 11 of the carrier frame 10 towards the control electronics assembly 21 via signal lines.

Based on the signals (e.g., an actual power demand signal), the control electronics assembly 21 controls the battery submodules 40 on the second component carriers 30 to provide an electric power that meets the actual power demand. Therefore, the control electronics assembly 21 is electrically and electronically connected to the first component carrier 20, which is electrically and electronically connected to the adjacent second component carrier 30, which is electrically and electronically connected to the battery submodule 40 attached thereto and to the next adjacent second component carrier 30, and so on. Via the electronic connection, the control electronics assembly 21 transmits the signals for controlling the battery submodules 40. The electric current provided by the battery submodules 40 in response to these signals is transmitted via the electrical connection to the first component carrier 20, and is transmitted from the first component carrier 20 via the power ports 23 and the external power ports 12 to electrical consumers. In some embodiments, the control signals are modulated based on the currents or voltages between the first component carrier 20 and the second component carriers 30 or the battery submodules 40.

Figure 5:
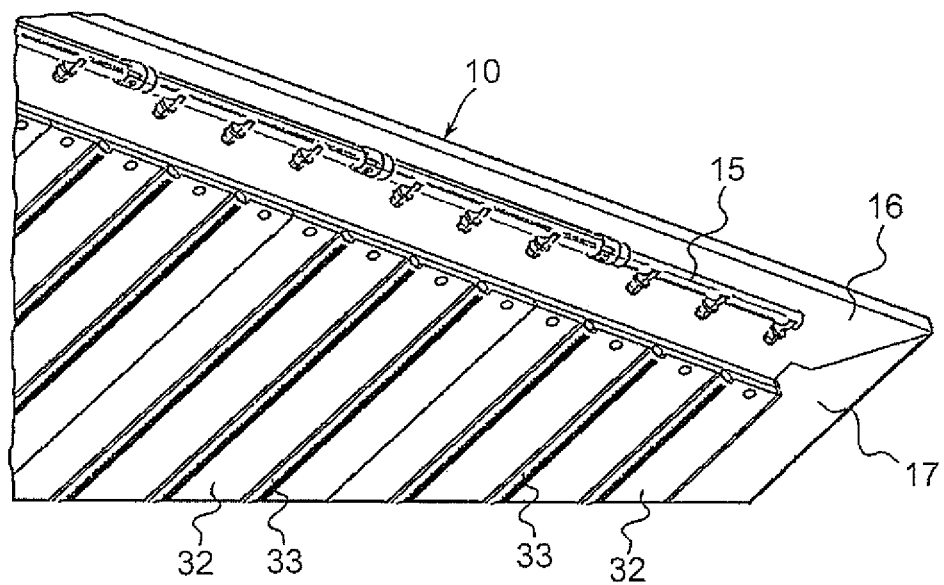
FIG. 5 is a perspective view of a bottom of an assembled battery module carrier according to an exemplary embodiment of the present invention.

FIG. 5 is a perspective view of the bottom of an assembled battery module carrier 100 according to an exemplary embodiment of the present invention. Referring to FIG. 5, in some embodiments, two crossbeams 17 and two longitudinal beams 16 are assembled to form the carrier frame 10. Each of the beams 16, 17 extend in a respective outward direction to form a ground plate frame, as described above with reference to FIG. 1. One of the crossbeams 17 includes the external power port 12 and the external signal port 11 and is adjacent to the first component carrier 20. The plurality of second component carriers 30 are received in the carrier frame 10 and are attached to the longitudinal beams 16 using connection elements (e.g., screw holes) and fixing members (e.g., screws). Each of the second component carriers 30, shown from below in FIG. 5, include a ground plate 32 and coolant ducts 33 (e.g., three coolant ducts) integrated into (or integral with) the ground plate 32. A coolant distribution line 15 is fluidly connected to an external coolant circuit via an external coolant port of the battery module carrier 100 (e.g., an end portion of the coolant distribution line) and includes a plurality of connecting pieces. Each connecting piece connects the coolant distribution line 15 to a second coolant duct 33 via a respective second coolant port 31 of the respective second component carrier 30.

Referring to FIGS. 1 and 5, coolant is provided by an external coolant circuit to the coolant distribution line 15 that extends along the longitudinal beam 16. Via the coolant distribution line 15, the coolant is provided to the first and second coolant ports 24, 31 of the first component carrier 20 and the second component carriers 30 (e.g., the six second component carriers 30), respectively, and flows through the respective cooling ducts through the respective first and second ground plates 25, 32.

REFERENCE SIGNS 1 secondary battery cell
10 carrier frame
11 external signal port
12 external power port
13 opening
15 coolant distribution line
16 longitudinal beam
17 crossbeam
20 first component carrier
21 control electronics assembly
22 signal port
23 power port
24 first coolant port
25 first ground plate
30 second component carrier
31 second coolant port
32 second ground plate
33 second coolant duct
40 battery submodule
41 side beam
42 swelling restrictor
43 front plate
50 ground plate frame
100 battery module carrier
200 battery system

What is claimed is:
1. A battery module carrier comprising:
a carrier frame configured to accommodate a first component carrier and a plurality of second component carriers, the first component carrier comprising an aluminum or plastic extrusion profile having a control electronics assembly and a signal port arranged thereon, each of the second component carriers comprising an extrusion profile and being configured to accommodate a battery submodule, each of the second component carriers forming a unit together with the battery submodule accommodated therein, the unit being configured to be attached and detached from the carrier frame,
wherein the carrier frame is configured to provide an external electronic connection to the first component carrier via the signal port, wherein each of the first component carrier and the second component carriers is configured to be individually attached and detached from the carrier frame, wherein the carrier frame comprises a plurality of longitudinal beams and a plurality of crossbeams, wherein the first and second component carriers are individually directly connected to the longitudinal beams or to the crossbeams by connection elements, and wherein the first and second component carriers are mechanically interconnected via a plurality of bolts configured to provide at least one of an electrical connection and an electronic connection between the first component carrier and the second component carriers and/or the battery submodule.

2. The battery module carrier according to claim 1, wherein the carrier frame comprises an external electric port configured to electrically connect an external power circuit to the second component carriers, the battery submodule, and/or a power port of the first component carrier.

3. The battery module carrier according to claim 1, wherein the first component carrier is electrically connected to the second component carriers and/or the battery submodule.

4. The battery module carrier according to claim 1, wherein the carrier frame comprises an external signal port configured to electronically connect the battery module carrier to an external control unit.

5. The battery module carrier according to claim 1, wherein the control electronics assembly comprises a battery monitoring unit.

6. The battery module carrier according to claim 1, further comprising external coolant ports configured to fluidly connect the battery module carrier to an external coolant circuit, the external coolant ports being connected to or integrated in the carrier frame, wherein each of the second component carriers comprises second coolant ports and a second ground plate with a second coolant duct fluidly connected to the second coolant ports, the second coolant ports being fluidly connected to the external coolant ports.

7. The battery module carrier according to claim 6, wherein the first component carrier comprises first coolant ports and a first ground plate comprising a first coolant duct fluidly connected to the first coolant ports, the first coolant ports being fluidly connected to the external coolant ports.

8. The battery module carrier according to claim 7, wherein the second component carriers and/or the first component carrier further comprises a side plate with a coolant duct fluidly connected to the respective first or second coolant ports.

9. The battery module carrier according to claim 8, wherein the carrier frame is connected to or comprises a coolant distribution line fluidly connected to the external coolant ports, and wherein the coolant distribution line is configured to be fluidly connected to at least one of the first coolant ports of the first component carrier and to each of the second coolant ports of the plurality of second component carriers.

10. The battery module carrier according to claim 1, further comprising:

a ground plate attached to the carrier frame and connected to or comprising a coolant duct; and external coolant ports configured to fluidly connect the battery module carrier to an external coolant circuit, the external coolant ports being fluidly connected to the coolant duct of the ground plate.

11. The battery module carrier according to claim 1, wherein the first and second component carriers have U-shaped, L-shaped, or T-shaped profiles.

12. A battery system comprising:

a carrier frame defining an interior space and having an opening open from the interior space of the carrier frame to outside of the carrier frame;

a first component carrier in the interior space of the carrier frame and comprising a control electronics assembly and a signal port; and a second component carrier in the interior space of the carrier frame and comprising a battery submodule, the second component carrier and the battery submodule together forming a unit, the unit being configured to be attached and detached from the carrier frame, wherein the signal port of the first component carrier protrudes into the opening in the carrier frame for connection to an external electronic connection, wherein each of the first component carrier and the second component carrier is configured to be individually directly connected to the carrier frame, and wherein the first and second component carriers are mechanically interconnected via a plurality of bolts configured to provide at least one of an electrical connection and an electronic connection between the first component carrier and the second component carriers and/or the battery submodule.

13. A vehicle comprising a battery system, the battery system comprising:

a carrier frame comprising:

a first component carrier comprising an aluminum or plastic extrusion profile and having a control electronics assembly and a signal port arranged thereon; and a plurality of second component carriers, each comprising an extrusion profile and having a battery submodule arranged thereon, each of the second component carriers forming a unit together with the battery submodule arranged thereon, the unit being configured to be attached and detached from the carrier frame, wherein the carrier frame is configured to provide an external electronic connection to the signal port of the first component carrier, wherein each of the first component carrier and the second component carriers is configured to be individually detached from the carrier frame, wherein the carrier frame comprises a plurality of longitudinal beams and a plurality of crossbeams, wherein the first and second component carriers are individually directly connected to the longitudinal beams or to the crossbeams by connection elements, and wherein the first and second component carriers are mechanically interconnected via a plurality of bolts configured to provide at least one of an electrical connection and an electronic connection between the first component carrier and the second component carriers and/or the battery submodule.

14. A vehicle comprising a battery module carrier, the battery module carrier comprising:

a carrier frame accommodating a first component carrier and a second component carrier in an interior space thereof, the first component carrier comprising a control electronics assembly and a signal port, the second component carrier being configured to accommodate a battery submodule, the second component carrier forming a unit together with the battery submodule accommodated therein, the unit being configured to be attached and detached from the carrier frame, wherein the carrier frame has an opening from the interior space of the carrier frame to outside of the carrier frame, the signal port protruding into the opening in the carrier frame for connection to an external electronic connection, wherein each of the first component carrier and the second component carrier is configured to be individually directly attached to and detached from the carrier frame, and wherein the first and second component carriers are mechanically interconnected via a plurality of bolts configured to provide at least one of an electrical connection and an electronic connection between the first component carrier and the second component carriers and/or the battery submodule.

* * * * *